United States Patent [19]

Hess et al.

[11] 4,179,251
[45] Dec. 18, 1979

[54] MULTIPLE EXTRUSION HEAD EXTRUSION BLOW MOULDING APPARATUS

[75] Inventors: Dieter Hess, Swistal-Morenhoven; Carsten Friedrichs, Bad Honnef; Werner Daubenbüchel, Bensberg-Refrath, all of Fed. Rep. of Germany

[73] Assignee: Kautex-Werke Reinold Hagen GmbH, Fed. Rep. of Germany

[21] Appl. No.: 753,152

[22] Filed: Dec. 21, 1976

[30] Foreign Application Priority Data

Dec. 24, 1975 [DE] Fed. Rep. of Germany ....... 2558780

[51] Int. Cl.² .................................... B29D 23/04
[52] U.S. Cl. ........................... 425/140; 425/145; 425/464; 425/466; 425/467; 425/532
[58] Field of Search ............. 425/DIG. 206, 381, 466, 425/382, 464, 140, 150, 532, 557, 558, 145, DIG. 231; 264/98, 209, 40.2, 40.1, 40.7

[56] References Cited

U.S. PATENT DOCUMENTS

| | | | |
|---|---|---|---|
| 3,386,132 | 6/1968 | Fischer | 425/381 |
| 3,466,704 | 9/1969 | Fogelberg et al. | 425/532 X |
| 3,611,494 | 10/1971 | Feuerherm | 425/381 X |
| 3,759,648 | 9/1973 | Hunkar | 425/140 |
| 3,865,528 | 2/1975 | Roess | 425/466 X |
| 3,918,874 | 11/1975 | Dybala et al. | 425/DIG. 206 |

FOREIGN PATENT DOCUMENTS

| | | | |
|---|---|---|---|
| 1900532 | 8/1970 | Fed. Rep. of Germany | 425/380 |
| 1934284 | 2/1971 | Fed. Rep. of Germany | 425/381 |
| 1226366 | 3/1971 | United Kingdom | 425/381 |

Primary Examiner—Mark Rosenbaum
Attorney, Agent, or Firm—Seidel, Gonda, Goldhammer & Panitch

[57] ABSTRACT

Multiple extrusion head extrusion-blow moulding apparatus, preferably using a common continuously operating extrusion conveyor, in which apparatus the various extrusion heads have their accumulator pistons driven for identical and simultaneous movement during the extrusion strokes either by means of a common drive means or by separate drive means each controlled from a common control means. Common control may also be exercised over the charging stroke of the accumulator piston.

Closed loop control over the wall thickness in dependence upon the final length of the parison, as well as open loop control over the wall thickness in response to a desired program may be imposed simultaneously on the extrusion orifice gap width.

12 Claims, 5 Drawing Figures

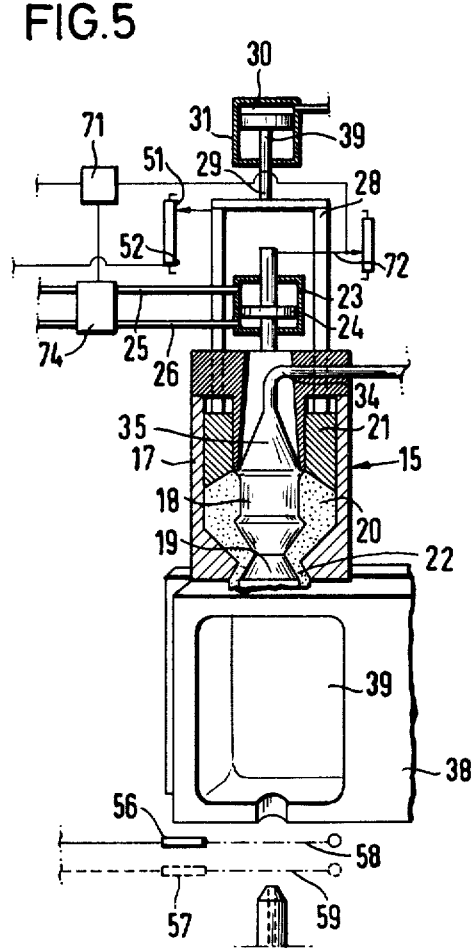

MULTIPLE EXTRUSION HEAD EXTRUSION BLOW MOULDING APPARATUS

The present invention relates to extrusion blow moulding apparatus including at least two extrusion heads, preferably provided with a common extruder, for producing parisons, and at least one blow-mould, in which these parisons are expanded, using a pressurised blowing medium.

In such apparatus it is known for each extrusion head to be provided with an inlet orifice, an accumulator chamber which can be emptied by means of an accumulator piston, and an outlet orifice for the thermoplastic material. In the case of the manufacture of tubular parisons, this outlet orifice is in the shape of an annular gap. Since this is the most common application in practice, the exemplary description which follows presupposes throughout the manufacture of a tubular parison, and the use of a correspondingly designed accumulator chamber and of an annular outlet gap. However, the invention is also applicable to parisons which have a different shape, for example where the parisons to be extruded are of strip-like or sheet-like form, and here again different shapes of cross-section are possible.

The use of extrusion heads with an accumulator chamber, such as is disclosed for example in German Offenlegungsschrift No. 1,704,791 and in U.S. Pat. No. 3,611,494, has the consequence that the material issues discontinuously through the outlet orifice, substantially under the action of the accumulator piston which sweeps the accumulator chamber. At the same time, a small proportion of the material forming the parison will also originate directly from the extruder upstream from the extrusion heads; and this extruder operates continuously for example in the case of the apparatus according to the above mentioned Offenlegungsschrift No. 1,704,791 and U.S. Pat. No. 3,611,494, and thus feeds material into the extrusion head even during the extrusion step during which the parison is being formed.

In every case, that is to say regardless of whether the material which forms the parisons originates exclusively from the corresponding accumulator chamber or also issues from the extrusion head directly as it comes from the extruder, it is an unavoidable feature of the above noted known apparatuses that the pistons which empty the accumulator chambers require different periods of time for the extrusion stroke. This applies, even given the precondition that the pistons of all the extrusion heads commence an extrusion-inducing stroke simultaneously. The differences in the duration of the extrusion-inducing stroke are attributable to several factors, inter alia to the fact that it is virtually never possible to apply a pressurised medium under precisely equal conditions to, for example, all the hydraulic cylinders which drive the respective accumulator chamber pistons. To this are added factors resulting from, for example, different temperatures and hence different pressure conditions in the extrusion heads. The situation described above results in certain disadvantages. If—as is generally customary—the extrusion heads cooperate with a conjoint blow-mould having a number of identical mould cavities corresponding to the number of extrusion heads, then the fact that the extrusion steps terminate at different times results in one or more of sets of parisons, in respect of which the extrusion step has terminated before the instant of termination of the extrusion of the last parison of the set, hanging for a certain period of time from the extrusion head, until the extrusion step of the last parison of the set has been terminated, at which time the blow-mould can be closed. Necessarily, the completion of the last parison, i.e. termination of the step of extruding this last parison, must occur before the blow-mould can be closed. In the interval between the instant of completion of an earlier finished parison of a set and the instant of completion of the last-finished parison of the set, the lengths of the earlier finished parisons can undergo changes which, depending on the nature of the material, can be extension, caused by the suspended weight of the parison, or shortening due to contraction of the material from which the parison is formed. Of course, the intervals concerned will always be very short. Nevertheless, they are sufficient to allow these undesirable phenomena to occur.

These changes in length are particularly disadvantageous because the wall thickness of the parison is frequently subjected to closed-loop control in accordance with a predetermined program. This is achieved by altering the gap width of the outlet orifice during the extrusion step. If the gap width is increased, the wall thickness will increase, and if the gap width is reduced then a lower wall thickness will result. Thus, there exists the possibility of providing the parison with different wall thicknesses over its length, the position and distribution of the individual wall thickness regions being suited to particular requirements which may stem from the end product. The programming of the wall thickness and hence the required adjustment of the gap width of the outlet orifice, are normally subjected to closed-loop control as a function of the extrusion stroke of the accumulator piston which sweeps the accumulator chamber, the starting point being a desired "normal" length of the parison and a certain position of the parison relative to the blow-mould.

The total stroke of the accumulator piston which sweeps the accumulator chamber is, coordinated with the programmer in such a way that the end position which the accumulator piston occupies at the beginning of the extrusion stroke process is coordinated with the starting position of the programmer, while the end position of the accumulator piston upon termination of the extrusion stroke is coordinated with the terminal position of the programmer.

Altering the length of the parison will cause the individual regions thereof having a given wall thickness also to undergo corresponding changes in their relative position along the longitudinal axis of the parison so that the individual regions then no longer occupy the correct position relative to the blow-mould and to its mould cavity.

Another important disadvantage associated with the different duration of the extrusion strokes is that a separate programming device must be allotted to each extrusion head for applying the wall thickness program to the parison. In view of the relatively high cost of such a programming device, the total apparatus is thereby made substantially more expensive. The use of only one conjoint programming device for all extrusion heads is not possible in the case of known apparatuses, since the different extrusion stroke speeds for the individual parisons would necessarily also cause the individual regions of a given wall thickness to occupy an incorrect relative position along the longitudinal axis of the parison.

It is an object of the invention to provide a multiple extrusion head blow moulding apparatus in which, simultaneous and uniform production of the parisons is possible.

It is a further object to provide a multiple head blow moulding apparatus in which the extrusion steps of all the extrusion heads and hence the production of all the parisons, should be terminated substantially simultaneously. Thus, it should be possible to alter the contour of the wall of the parison by means of an open-loop wall thickness control device instead of a closed loop control device, i.e. without the need to monitor the wall thickness during the extrusion step.

It is another object of the present invention to provide a multiple extrusion head blow moulding apparatus of simplified and hence cheaper form.

According to the present invention we provide multiple extrusion head extrusion blow moulding apparatus in which each extrusion head is provided with an inlet orifice, an accumulator chamber which can be emptied by means of a piston, and an outlet orifice for the thermoplastic material, and the pistons of all extrusion heads are driven for identical and simultaneous movement in respect of position and/or speed during the parison extruding stroke. In this way it is possible to achieve very far-reaching synchronisation during expulsion of the parisons from the various extrusion heads, so that the extrusion steps of all the extrusion heads are also terminated substantially simultaneously. This thus avoids the disadvantages which could arise from one or other parison reaching its intended length earlier, that is to say being finished earlier, than the instant at which the blow-mould is closed.

Preferably the pistons of all extrusion heads are also driven for identical and simultaneous movement during the the filling stroke. In this way it is possible to achieve a situation where the filling stroke of the pistons of all extrusion heads is also terminated substantially at the same instant, so that the subsequent extrusion stroke of all extrusion heads can commence without delay.

The accumulator pistons of all the extrusion heads can be provided with a conjoint drive device, for example a hydraulic ram. Another possibility is that the accumulator piston of each extrusion head is provided with its own drive and a position indicator and the signals triggered by the position indicators of all extrusion heads are fed to a comparator device to generate a comparison signal for controlling the various drive means in a common manner.

It has proved particularly advantageous to allocate a conjoint programming device to all extrusion heads. Apart from the lower manufacturing costs of the total apparatus, this also has the advantage of simpler handling, since when using two or more programming devices a change in program has to be fed to each programming device separately. This can result in operating errors or errors due to inadequate reproducibility of the setting, for which reason substantial control of the articles manufactured is necessary as a precaution. These additional efforts are unnecessary if only one conjoint programming device is used for all extrustion heads.

If the accumulator piston of each extrusion head is provided with its own drive uniform control, or synchronisation, of position and/or speed of an accumulator piston can be achieved if the piston of one of the extrusion heads serves as a reference piston for the position and/or speed of the pistons of all other extrusion heads. Another possibility is that the positions and/or speeds of the accumulator pistons of all extrusion heads can be subjected to closed-loop control as a function of a mean reference value which may be predetermined.

Means may be provided for adjusting the gap width of the outlet orifice of each extrusion head as a function of the final length of the corresponding parison. This provides, in a simple manner, the possibility of maintaining the correct length of the particular parison. In particular, the application of this teaching makes it superfluous to employ known measures for the closed-loop control of the final length of the parison, which measures would consist of varying the charging stroke of the accumulator piston, and hence the volume of the accumulator, as a function of the final length of the parison. This last-mentioned measure is disadvantageous because it causes fluctuations in the weight of the parison and hence also of the finished product to be manufactured therefrom. In contrast, the type of open-loop control described above takes account of the fact already mentioned that changes in length of the parison, for a constant volume of the accumulator chamber, are essentially only attributable to changes in the elastic recovery or swelling characteristics of the thermoplastic material immediately after it passes the outlet orifice of the extrusion head, and these changes can be compensated by a corresponding change of the gap width of the outlet orifice. It is a particularly advantageous fact that when applying the teaching according to the invention the parisons, and hence also the blown end products, have a uniform weight.

Furthermore, the arrangement made can be such that an adjustment of the gap width of the outlet orifice only takes place after a predetermined tolerance range, in respect of the change of the final length of the corresponding parison, has been exceeded.

If the accumulator pistons of each extrusion head are provided with their own drive it is advantageous to arrange for final adjusting elements, for example servovalves, to be connected in the hydraulic lines to ram cylinders for the accumulator pistons of the respective accumulator chambers, by means of which the piston speed and/or piston position can be subjected to closed-loop control during the extrusion stroke and/or during the accumulator-charging stroke.

Another possible way of achieving a simultaneous start of the extrusion stroke of the accumulator pistons of all extrusion heads is that at the end of the charging stroke, any accumulator piston or pistons which reach the terminal position before the last piston to do so, are subjected to a delay, in respect of the start of the extrusion stroke, up to the instant at which even the piston of the particular extrusion head in which the filling stroke is the last to finish, begins the extrusion stroke.

In order to prevent over-filling of the accumulator corresponding to the faster piston, the hydraulic oil stream to be displaced from the expulsion cylinder is in this case cut by the servo valve.

Conveniently, two closed-loop control processes can take place superposed with regard to the adjusting of the gap width of the outlet orifice of the extrusion heads. On the one hand, the adjustment of a "basic" gap component, which serves for the closed-loop control of the final length of the parison, takes place. On the other hand, the total gap width is altered during the extrusion process in accordance with a predetermined program for regulating the wall thickness of the parison. This provides the possibility of simply adding the changes in gap value, resulting from the wall thickness programming, to the value of the "basic" gap component. A second possibility is to apply the changes in gap value, resulting from the particular wall thickness program during the extrusion process, to the "basic" gap component, proportionately to the instantaneous total gap.

In order that the present invention may more readily be understood, the following description is given, merely by way of example, of an illustrative embodiment of the invention. In these drawings:

FIG. 5 shows a section of FIG. 4, with some of the cooperating parts occupying a different position.

Figure 2:
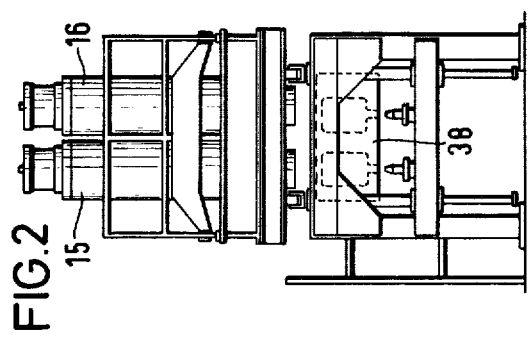
FIG. 2 shows the corresponding front view.
Figure 1:
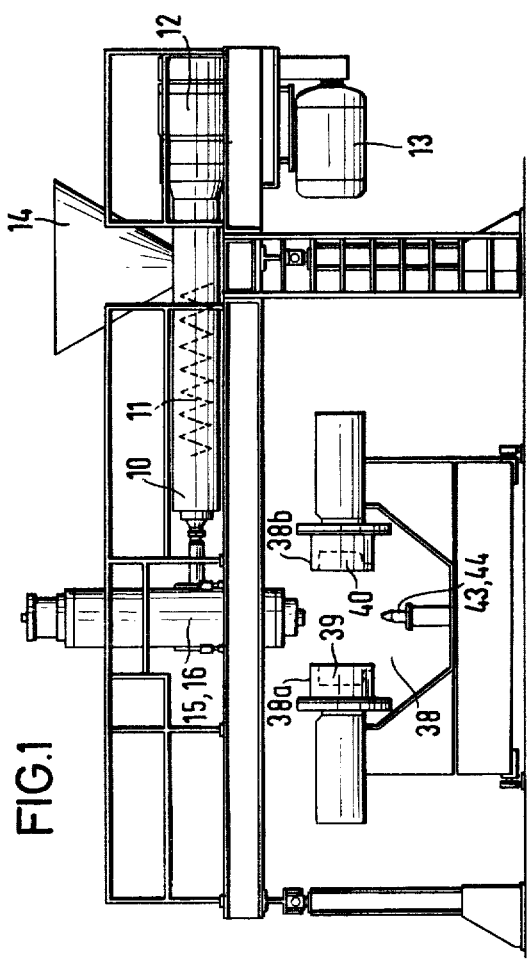
FIG. 1 shows the side view of an apparatus for the manufacture of hollow bodies from a thermoplastic material by blow-moulding.
Figure 3:
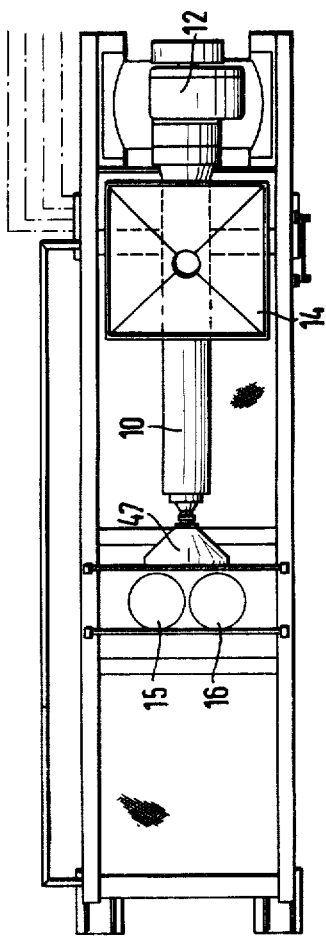
FIG. 3 shows the corresponding plan view.
Figure 4:
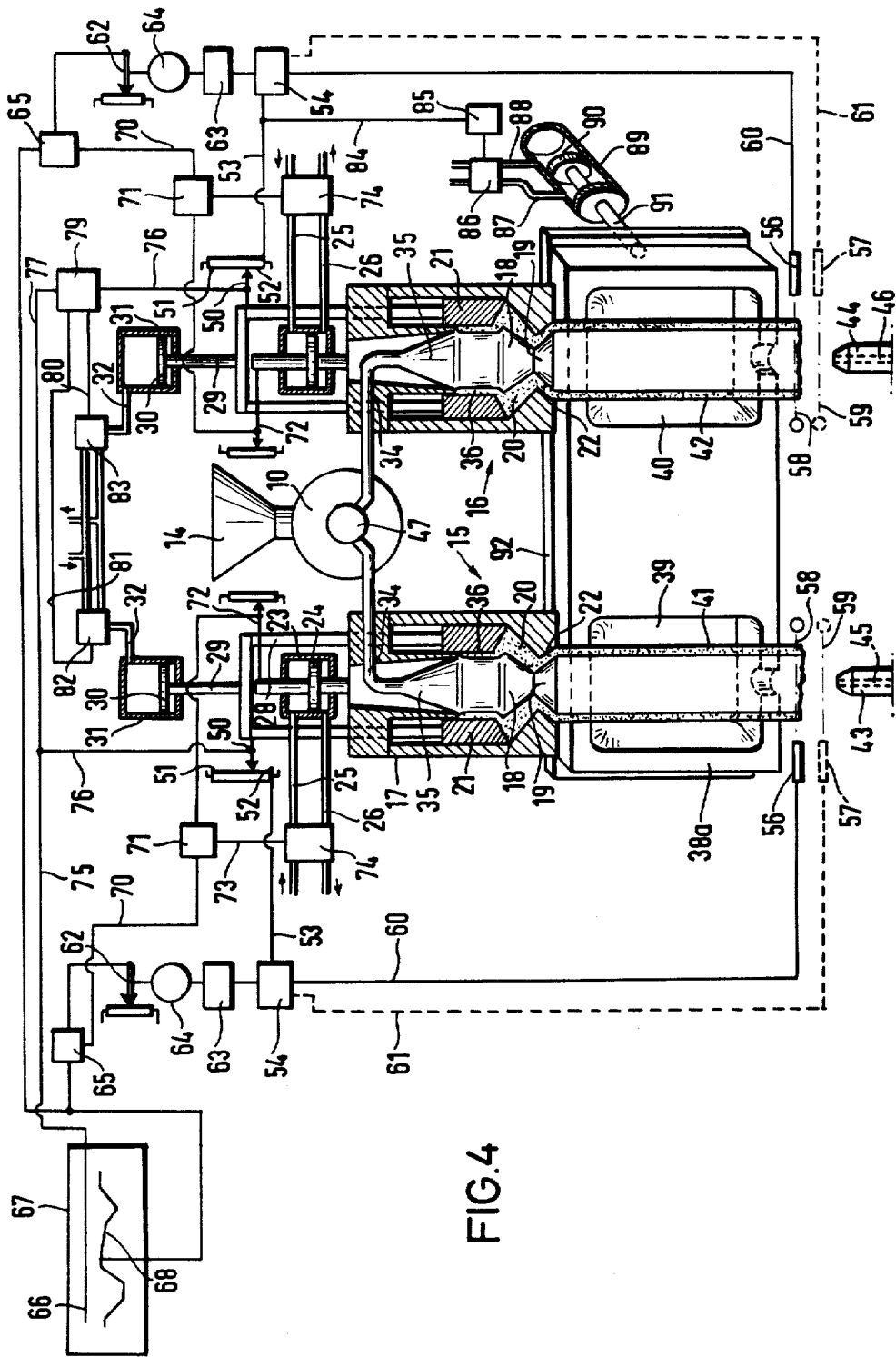
FIG. 4 shows a portion of the apparatus, with the relevant open-loop control devices.

The embodiment shown in the drawings comprises an extruder 10, the screw 11 of which is driven by a motor 13 through a gearbox 12. The thermoplastic material is fed to the extruder from a hopper 14. Downstream from the extruder 10 are two extrusion heads 15, 16 which, as shown in FIGS. 4 and 5, essentially each consist of a cover 17, a stationary mandrel 18, a core 19 mounted axially displaceable therein, an accumulator chamber 20, and an annular piston 21 mounted so as to be axially reciprocable.

At its lower end, the core 19 represents the inner limit of an annular extrusion gap 22. In its upper terminal region, the core 19 is provided with a piston 24 in a cylinder 23 forming a first ram having feed lines 25 and discharge lines 26 for the pressure medium.

The annular piston 21 has bolts 28, or the like, distributed over its periphery for connecting it to the piston rod 29 of a piston 30 in a cylinder 31 forming a second ram having feed and discharge lines 32 for the pressure medium, which is in this case a liquid.

The cover 17 of each of the two extrusion heads 15 and 16 is provided with an inlet orifice 34 through which the thermoplastic material is introduced before being brought to a shape having an annular cross-section via two mutually opposite, downwardly-flared channels 35. From the channels 35 the annular mass of thermoplastic material flows via the connecting channel 36 into the accumulator chamber 20, and in doing so displaces the annular piston 21 upwardly until it reaches its upper terminal position, shown in FIG. 5. The construction of the extrusion head may, to this extent, conform with the disclosure of Offenlegungsschrift No. 1,704,791 and U.S. Pat. No. 3,611,494.

Below the extrusion heads 15, 16 is a blow-mould 38 consisting of two mould halves 38a and 38b and provided with two identical mould cavities 39 and 40. The mould cavity 39 is allotted to extrusion head 15 and the mould cavity 40 to extrusion head 16, so that the parison 41 extruded from the extrusion head 15 is expanded within the mould cavity 39 and the parison 42 extruded from the extrusion head 16 is expanded in the mould cavity 40. This expansion or blowing is effected by means of a pressure medium, preferably compressed air. A blow mandrel, 43 or 44, is allotted to each of the respective mould cavities 39 and 40, to allow the pressure medium to be supplied to the interior of the respective tubular parisons 41, 42. For this purpose, each of the two mandrels 43 and 44 is provided with a bore 45 and 46, respectively. Both mandrels 43 and 44 are vertically reciprocable so that they can be advanced upwardly into the region of the mould 38, and of the parisons 41 and 42 contained therein, and can be retracted therefrom in the downward direction. In the course of the upward movement into the region of the mould 38, the mandrels 43, 44 are introduced into the lower end of the corresponding tubular parison 41 and 42, respectively.

However, alternatively from the configuration of the parts shown in the drawings, an arrangement can also be used where the blow mandrels can be introduced from above into the region of the mould 38 and hence into the upper ends of the parisons contained therein. Both of these possibilities are known in the prior art.

The apparatus illustrated in the drawings operates as follows: The material, once plasticised in the continuously running extruder 10, first flows out of the extruder into a connecting member 47 and is there divided into two sub-streams, so that one of the sub-streams is fed to each of the two extrusion heads 15, 16.

Each of the two sub-streams enters, through one of the two inlet orifices 34, into one of the two extrusion heads 15 and 16. In each of the extrusion heads, the plasticised material first flows through the channels 35 and the connecting channels 36 into the annular accumulator chamber 20 and then, as the accumulator chamber is filled progressively, the corresponding annular piston 21 is displaced upwards into the position shown in FIG. 5. At the end of the filling stroke, when the annular pistons 21 have reached their (adjustable) upper position, the pistons 30 are subjected to pressure, by suitable known means, through the lines 32, to drive the annular pistons 21 downwards into their lower terminal position shown in FIG. 4. As they do so, the thermoplastic material contained in the accumulator chambers 20 is extruded through the outlet orifices 22, in the shape of tubular parisons 41 and 42, into the regions between the two mould halves 38a and 38b of the mould 38, which at that instant is at least partially open.

As soon as the two parisons 41, 42 have been extruded to their intended length, the blow-mould 38 is closed, triggered by open-loop control pulses the generation of which will be described later, around the two parisons 41 and 42. Furthermore, before or after the closing sequence, the corresponding mandrel 43 or 44 is advanced into the lower end of the parison 41 or 42 respectively.

After expansion or blowing of the parisons to form hollow bodies, these hollow bodies remain in the mould for a certain period of time so that the thermoplastic material cools and solidifies. The mould is then opened and the finished hollow bodies, on which there may still be some waste parts or flash, are taken out of the mould 38 so that the latter can now receive the next extruded parisons 41 and 42. This situation is shown in FIG. 4.

A position indicator member 50 (FIG. 4) is allotted to each of the two annular pistons 21, the rise and fall of the indicator members being dependent on those of the annular pistons. This position indicator member 50 cooperates with two signal generators 51 and 52. In the lower position of the annular piston 21, and hence of the position indicator 50, the latter triggers a signal, via the signal generator 52, to indicate that the extrusion stroke of the annular piston 21 in the direction of the outlet orifice 22, and hence the formation of the respective parison 41 or 42, has been completed. This signal coming from the signal generator 52 passes via a line 53 to a comparator device 54.

Underneath the blow-mould 38, is a pair of photocells 56, 57 allotted to each of the two extrusion heads 15, 16 or each mould cavity 39, 40, in such a way that the corresponding light paths 58, 59 are interrupted by the lower end of the parisons 41, 42 as soon as these have reached a certain length. The photocells 56 and 57 and the respective light paths 58 and 59 are located one after another in the direction of extrusion of the parisons 41, 42 in such a way that first the light path 58 is interrupted and then, as the length of the parison increases, the light path 59 is also interrupted. The light path 58 indicates the minimum length which the parison 41 or 42 must reach in order to produce a perfect finished product.

The photocells 56 and 57 are also connected to the respective comparator devices 54 via lines 60, 61. The comparator devices ascertain whether, at the instant when the position indicator member 50, and hence the annular piston 21, of each extrusion head has reached the FIG. 4 position corresponding to the end of the extrusion stroke, the corresponding light path 58, and possibly the light path 59 has been interrupted. If, at that particular instant, no signal from the respective photocell 56 has reached the corresponding comparator device 54, it means that the parison 41 or 42 is too short. Alternatively, if a signal from the photocell 56 has already reached the comparator device 54 at the instant when the signal from the signal generator 50 reaches the comparator device 54, the corresponding parison 41 or 42 is too long. This excess length will be even more critical if, at the stated instant, a signal from the photocell 57 also then reaches the comparator device 54, or has already reached it, signifying interruption of the lower light path 59. If neither of the two light paths 58 and 59 is interrupted, that is to say if the parison 41 or 42 is too short, or if at the other extreme both light paths 58 and 59 are interrupted, that is to say a parison 41 and 42 which is present is much too long, a signal is fed from the relevant corresponding comparator device 54 to an adjustment device 62, which produces an adjustment of the basic gap of the outlet orifice 22 of the particular extrusion head 15 or 16. A switch 63 provided between the comparator device 54 and the adjustment device 62, serves to fix the magnitude of the correction, that is to say the degree by which the basic gap of the extrusion head is adjusted in each case if a signal has been received which demands a change. The corresponding actuation of the adjustment device 62 is effected by means of an adjustment motor 64.

As distinct from the embodiment shown in FIG. 4 of the drawings, it is also possible to use an arrangement whereby only one light path 58 is located below each mould cavity 39 or 40. In that case, the positioning of the photocell 56 and the light path 58 will be such that a signal from the particular photocell 56 will reach the corresponding comparator device once the parison 41 or 42 is longer than necessary. Conversely, if no signal is received from the photocell 56 then the corresponding parison is too short. In either case, a correction signal is fed from the comparator device 54 in question to the corresponding adjustment device 62, so that an adjustment of the basic gap of the extrusion head will be made every time. This means that in this embodiment there will be no tolerance range with regard to the final length of the parison.

The adjustment devices 62, which may, for example be motorised potentiometers, are each connected to a signal summing device 65, the other input of which is connected to a programmer 67. The programmer is set to a particular program in respect of the distribution of the wall thickness of the parisons 41 and 42 over their length. The curve 68 depicted in the block diagram illustration of the programmer 67 corresponds to the wall thickness open-loop control program and is related to the position of the mandrel 18 relative to the cover 17 of the respective extrusion head. The vertical spacing between the line 66 also shown in the programmer 67, and the curve 68 at each point along line 66 defines the instantaneous value of a gap component, which together with the value of the "basic" gap component defines the instantaneous width of the total gap of the outlet orifice 22. The width of the total gap of orifice 22 alters, during extrusion of the parison 41 or 42, in accordance with the shape of the curve 68. In addition, the "basic" gap value changes, in the manner already described, as dictated by the final length of the respective parison 41 or 42. Alterations of the "basic" gap values of the two extrusion heads 15 and 16 take place independently of one another. This is done in the manner already described, by means of the two adjustment devices 62 responsive to the photocells 56, 57. If the parison 41 or 42 is too long, the value of the corresponding "basic" gap component and hence also the width of the total gap will be increased. Conversely, if the parison 41 or 42 is too short, the value of the "basic" gap component and hence the width of the instantaneous total gap, will be reduced.

In the signal summing devices 65, signals, for example electrical potentials, coming from the programmer 67 and the particular adjustment device 62 are added.

The outputs of the two signal summing devices 65 are each connected by lines 70 to a closed-loop control device 71, the other input of which is in each case connected to a position indicator 72 responsive to the position of the respective piston 24, for adjusting the position of the cores 19, which provide the radially inner boundaries of the outlet orifices 22. The output of each closed-loop control device 71 is applied by a line 73 to a hydraulic servo-valve 74, which in turn is inserted into the feed lines and discharge lines 25, 26 of the corresponding hydraulic ram cylinder 23.

The program, in respect of the wall thickness of the parisons 41 and 42, set in the prgrammer 67 in accordance with the curve 68 is based as a function of the extrusion stroke of the piston 21 of extrusion head 15 or 16. The input connection to the programming device which this requires is provided via the lines 76 and 75. The closed-loop control devices 71 compare the actual position of the corresponding core 19, fed in through the corresponding position indicator 72, with the intended position of that core, which results from two parameters, namely from the point along the program curve 68 which corresponds to the particular position of the annular accumulator piston 21, and from the particular position of the adjustment device 62. If the actual position of the core 19 deviates from the intended position, corresponding correction signals are fed to the particular servo-valve 74, to result in correction of the position of the core 19 and hence of the width of the gap which forms the particular outlet orifice 22. At the same time, there may be an additional change in the "basic" gap component if the length of the parisons 41 or 42 lies outside the tolerance range defined by the spacing between the two light paths 58 and 59.

In the manner described above it is directly possible, given a constant volume of the accumulator chambers 20 and hence of the material forming the parisons 41 and 42, to subject the length dimension of the parison to closed-loop control, so that economical production of the end product is achieved, since this product does not contain more material than its function requires.

The setting of the width of the basic gap component is effected independently for the two extrusion heads 15, 16. On the other hand, the open-loop control of the wall thickness of the parisons 41 and 42 is effected conjointly for both extrusion heads 15, 16 by the single programming device 67. For this it is necessary that during the extrusion step the two annular accumulator pistons 21 should move substantially synchronously so that the wall thickness program is also positioned correctly relative to the lengthwise dimension of each parison 41 and 42. For this purpose, each of the two position indicators 50, which indicates the position of the corresponding annular accumulator piston 21, is connected, by way of the two branch lines 76 mentioned above. The position indicator 50 corresponding to the extrusion head 15 is additionally connected by a line 77 to a closed-loop control and comparator device 79, the outputs of which are each connected by lines 80, 81 to servo-valves 82, 83.

The servo-valve 82 is in the feed line 32 of the cylinder 31 allotted to the extrusion head 15, and the servo-valve 83 is in the feed line 32 of the cylinder 31 allotted to the extrusion head 16. By means of the comparator and closed-loop control device 79, the two positions indicated by the position indicators 50 are first compared with one another. If the position of the annular piston 21 of one extrusion head differs from that of the annular piston 21 of the other extrusion head, the supply of the pressure medium, generally a hydraulic medium, to at least one of the cylinders 31, is subjected to closed-loop control so that the movements of the annular pistons 21 of both extrusion heads 15, 16 are matched to one another, in respect of position and speeds, with the result that the extrusion of both parisons 41, 42 takes place very largely ganged and synchronously. This also ensures that both extrusion processes are completed virtually at the same time. The "basic" gap components of the two extrusion heads 15, 16 are as already stated, regulated independently of one another since here, because of different operating conditions in the individual extrusion heads 15, 16, it is entirely possible for differences also to occur in respect of conditions, such as the flow behaviour, of the thermoplastic material both in the extrusion heads and passing through the outlet orifice.

The ganging of the extrusion steps achievable by the apparatus of the present invention, also has the further important advantage that there is no time interval between the time of attainment of the intended length of one or more of the parisons 41, 42 and the time at which the blow-mould 38 is closed, whilst such an interval could be caused by the extrusion steps in the individual extrusion heads differing in duration.

As a result of the ganging of the extrusion steps in respect of the parisons 41 and 42, in accordance with the invention, it is possible to take the signal for closing the mould from one only of the two extrusion heads 15, 16. In the illustrative embodiment shown in FIG. 4 of the drawing, it is the extrusion head 16 on the right. In the lower position of the annular piston 21 of this extrusion head, its position indicator 50 triggers a signal, on reaching the lower signal generator 52, to the corresponding comparator device 54. This signal, which indicates that the formation of the parison 42 has been terminated, also passes down a line 84 to an open-loop control device 85, which acts on a valve 86 in the hydraulic feed and discharge lines 87, 88 to a cylinder 89 of a mould closing ram. The piston 90 of this ram, guided in the cylinder 89 opens and closes the blow-mould 38 through appropriate movements of the mould halves 38a and 38b. The signal coming from the signal generator 52 subjects the piston 90 to a pressure medium supplied through the line 88, as a result of which the blow-mould 38 becomes closed. The mould half 38a can be indirectly connected to the piston 90, in a manner which is in itself known. There is also the possibility of providing the mould half 38a with its own drive which would then also be subjected to open-loop control via the open-loop control element 85. For greater ease of operation the cylinder 89 with its corresponding parts is so arranged that the piston rod 91 of the piston 90 engages non-centrally on the holder plate 92 for the mould half 38b.

In an arrangement alternative to that shown in the drawing, the piston rod 91 may engage centrally on the holder plate 92 or the mould halves.

The upper signal generator 51 allotted to each of the two position indicators 50 indicates when the corresponding annular piston 21 has reached its upper terminal position. It is then possible to trigger a signal which applies pressure medium to the piston 30, for example by way of the servo-valve 82 or 83, whereby the movement of the annular piston 21 in the direction of the outlet orifice 22, and hence the extrusion of the parison 41 or 42, are triggered.

The comparator and open-loop control device 79, and the two servo-valves 82 and 83, can also be used to synchronise the movement of the two annular pistons 21 away from the outlet orifice 22, during the filling of the two accumulator chambers 20, in such a way that both annular pistons 21 complete their charging strokes simultaneously. This ensures that the subsequent extrusion strokes of both annular pistons 21 also start simultaneously. This can be achieved in a simple manner if both annular accumulator pistons 21, or if appropriate only one of the two pistons, can in the uppermost terminal position actuate a limit switch which causes pressure medium to be applied to the two cylinders 31 at the ends of the two pistons 30.

In general, both signal generators 51 and 52 will be adjustable so that the system can be adapted to the accumulator volume required for the manufacture of a particular type of hollow body.

An alternative arrangement from that shown in the drawing is one where, as has already been mentioned, a common drive is allocated to both annular accumulator pistons 21. For this it suffices, for example, to connect the two piston rods 29 to one another by means of a cross-member driven by the piston rod of a single, preferably centrally arranged, cylinder 31.

The term "programmer" used throughout this specification is intended to include all suitable programming devices.

We claim:

1. Multiple extrusion head extrusion blow moulding apparatus comprising a plurality of extrusion heads for forming parisons of a thermoplastic material to be blown, each extrusion head being provided with: (a) an inlet orifice, (b) an accumulator chamber in communication with said inlet orifice, (c) an outlet orifice for the thermoplastic material, and (d) a piston slidably positioned within said accumulator chamber for emptying said accumulator through said outlet orifice to form a parison of said thermoplastic material, and means operatively associated with said pistons for driving all the pistons of all extrusion heads for identical and simultaneous movement in respect of position and/or speed during their parison-extruding strokes, said means comprising a plurality of drive means and position indicators, each of said plurality of drive means being associated with a respective one of the pistons, and wherein a comparator device is connected to receive the signals triggered by the position indicators of all extrusion heads for generating a comparison signal for controlling the various drive means in a common manner.

2. Apparatus according to claim 1 wherein said comparator devices are connected to be responsive to the position of the piston of one of the extrusion heads which thereby serves as a reference piston for the control of the position and/or speed of the pistons of all other extrusion heads.

3. Apparatus according to claim 1 and including closed-loop control means operatively associated with said pistons for subjecting the positions and/or speeds of the pistons of all extrusion heads to closed-loop control as a function of a mean reference value.

4. Apparatus according to claim 1, and including a movable core within each accumulator chamber and a conjoint programming device common to all extrusion heads for controlling the position of said movable cores with respect to said outlet orifices to thereby control the size of said outlet orifices.

5. Apparatus according to claim 4 wherein said conjoint programming device controls the size of said outlet orifice in each extrusion head in accordance with a selected contour curve to thereby vary the thickness of the parison being extruded.

6. Apparatus in accordance with claim 5 including means responsive to the length of a parison being extruded from each extrusion head for adjusting individually the size of each outlet orifice being controlled by said conjoint programming device as a function of the final length of the corresponding parison.

7. Apparatus according to claim 1 wherein the accumulator chambers of all extrusion heads have equal swept volumes.

8. Apparatus according to claim 1, and including hydraulic drive means with drive rams for driving the pistons of the extrusion heads, and final adjustment elements connected to feed and discharge lines of the hydraulic drive rams for the pistons, whereby the piston speed and/or piston position can be subjected to closed-loop control during the extrusion stroke and/or during the charging stroke of the piston.

9. Apparatus according to claim 1, and including means operatively associated with said pistons for driving the pistons of all extrusion heads for identical and simultaneous movement during their accumulator chamber-filling strokes.

10. Apparatus according to claim 1 further comprising means for detecting the final length of a parison being extruded, comparator means for determining if the parison length is too long or too short, and means for adjusting the size of the outlet orifice of each extrusion head responsive to the corresponding comparator determination.

11. Apparatus according to claim 10, wherein said parison length detecting means define a tolerance range in respect of the change of the final length of the extruded parison, and wherein said means for adjusting the size of the outlet orifice only effects controlling adjustment after said predetermined tolerance range has been exceeded.

12. Apparatus according to claim 10, and including a movable core within each accumulator chamber, said core defining the inner limit of said outlet orifice, whereby the size of the outlet orifice may be adjusted by moving said core in response to said comparator determination.

* * * * *